US010026413B2

(12) United States Patent
Laaksonen et al.

(10) Patent No.: US 10,026,413 B2
(45) Date of Patent: Jul. 17, 2018

(54) METHODS, APPARATUSES FOR FORMING AUDIO SIGNAL PAYLOAD AND AUDIO SIGNAL PAYLOAD

(71) Applicant: Nokia Technologies Oy, Espoo (FI)

(72) Inventors: Lasse Laaksonen, Tampere (FI); Anssi Rämö, Tampere (FI); Adriana Vasilache, Tampere (FI)

(73) Assignee: Nokia Technologies Oy, Espoo (FI)

( * ) Notice: Subject to any disclaimer, the term of this patent is extended or adjusted under 35 U.S.C. 154(b) by 142 days.

(21) Appl. No.: 15/127,143

(22) PCT Filed: Mar. 13, 2015

(86) PCT No.: PCT/FI2015/050160
§ 371 (c)(1),
(2) Date: Sep. 19, 2016

(87) PCT Pub. No.: WO2015/140398
PCT Pub. Date: Sep. 24, 2015

(65) Prior Publication Data

US 2017/0103769 A1 Apr. 13, 2017

(30) Foreign Application Priority Data

Mar. 21, 2014 (GB) .................................. 1405123.9

(51) Int. Cl.
*H04J 3/16* (2006.01)
*G10L 19/24* (2013.01)
(Continued)

(52) U.S. Cl.
CPC ............ *G10L 19/24* (2013.01); *G10L 19/008* (2013.01); *G10L 19/167* (2013.01)

(58) Field of Classification Search
CPC ...... G10L 19/24; G10L 19/008; G10L 19/167
(Continued)

(56) References Cited

U.S. PATENT DOCUMENTS 3,643,252 A * 2/1972 Roberts, Jr. ............ G09G 1/007
340/4.51
4,607,364 A * 8/1986 Neumann ............ H04M 11/068
370/470
(Continued)

FOREIGN PATENT DOCUMENTS

EP 1617413 1/2006
EP 2254110 11/2010
(Continued)

OTHER PUBLICATIONS

International Search Report and Written Opinion received for corresponding Patent Cooperation Treaty Application No. PCT/FI2015/050160, dated May 29, 2015, 16 pages.
(Continued)

*Primary Examiner* — Thai Hoang
(74) *Attorney, Agent, or Firm* — Nokia Technologies Oy

(57) ABSTRACT

It is disclosed inter alia a method for forming an audio payload frame, wherein the audio payload frame comprises: an encoded audio data frame with a first marker bit at the front of the encoded audio data frame, wherein the first marker is set to a first value, and wherein the first value denotes a type of encoded audio data in the encoded audio data frame; an extension encoded audio data frame; and a second marker bit in front of the first marker bit, wherein the second marker bit is set to a second value; and wherein the second value denotes a type of encoded audio data other than the type of encoded audio data in the encoded audio data frame.

18 Claims, 5 Drawing Sheets

(51) Int. Cl.
*G10L 19/008* (2013.01)
*G10L 19/16* (2013.01)

(58) Field of Classification Search
USPC .............................. 370/389–395.65, 465–475
See application file for complete search history.

(56) References Cited

U.S. PATENT DOCUMENTS 4,868,658 A * 9/1989 Coleman .............. H04N 7/0806 348/E7.039
5,530,655 A * 6/1996 Lokhoff ................ G10L 19/008 375/240.03
6,141,353 A * 10/2000 Li .......................... H04B 1/707 370/465
6,693,919 B1 * 2/2004 Kameyama ........ H04Q 11/0478 370/252
6,947,427 B1 * 9/2005 Rokugo .................. H04L 29/06 370/395.5
8,665,882 B2 * 3/2014 Hall .................. H04L 12/40163 370/395.42
2006/0245438 A1 * 11/2006 Sajassi .................... H04L 12/18 370/399
2007/0225971 A1 * 9/2007 Bessette .............. G10L 19/0208 704/203
2009/0028189 A1 * 1/2009 Kato ....................... G10L 19/24 370/476
2009/0154499 A1 * 6/2009 Yamakage ............... H04N 7/52 370/474

FOREIGN PATENT DOCUMENTS

| | | |
|---|---|---|
| WO | 9721310 | 6/1997 |
| WO | 0079520 | 6/2000 |
| WO | 2007043811 | 4/2007 |
| WO | 2010005224 | 1/2010 |
| WO | 2010117327 | 10/2010 |

OTHER PUBLICATIONS

Search Report received for corresponding GB Application No. 1405123.9 , dated Sep. 5, 2014, 3 pages.

* cited by examiner

METHODS, APPARATUSES FOR FORMING AUDIO SIGNAL PAYLOAD AND AUDIO SIGNAL PAYLOAD

RELATED APPLICATION

This application was originally filed as PCT Application No. PCT/FI2015/050160 filed Mar. 13, 2015, which claims priority benefit from GB Patent Application No. 1405123.9 filed Mar. 21, 2014.

FIELD

The present application relates to a payload format for a multichannel or stereo audio signal encoder, and in particular, but not exclusively to a payload format for a multichannel or stereo audio signal encoder for use in portable apparatus.

BACKGROUND

Audio signals, like speech or music, are encoded for example to enable efficient transmission or storage of the audio signals.

Audio encoders and decoders (also known as codecs) are used to represent audio based signals, such as music and ambient sounds (which in speech coding terms can be called background noise).

An audio codec can also be configured to operate with varying bit rates. At lower bit rates, such an audio codec may be optimized to work with speech signals at a coding rate equivalent to a pure speech codec. At higher bit rates, the audio codec may code any signal including music, background noise and speech, with higher quality and performance. A variable-rate audio codec can also implement an embedded scalable coding structure and bitstream, where additional bits (a specific amount of bits is often referred to as a layer) improve the coding upon lower rates, and where the bitstream of a higher rate may be truncated to obtain the bitstream of a lower rate coding. Such an audio codec may utilize a codec designed purely for speech signals as the core layer or lowest bit rate coding.

An audio codec can also adopt a multimode approach for encoding the input audio signal, in which a particular mode of coding is selected according to the channel configuration of the input audio signal. Switching between the various modes of operation requires the provision of some sort of in-band signalling in order to inform the decoder of the particular mode of coding. Typically, this in-band signalling may take the form of mode bits which require a proportion of the audio payload format which therefore consumes transmission bandwidth.

Additionally, the audio payload format may need to have the provision for supporting future changes to the multimode audio signal format whilst still maintaining the ability to cope with legacy modes of coding.

SUMMARY

There is provided according to the application method comprising forming an audio payload frame from an encoded audio data frame; appending a first marker bit at the front of the encoded audio data frame, wherein the first marker is set to a first value, and wherein the first value denotes a type of encoded audio data in the encoded audio data frame; adding an extension encoded audio data frame to the audio payload frame; and appending a second marker bit in front of the first marker bit, wherein the second marker bit is set to a second value; and wherein the second value denotes a type of encoded audio data other than the type of encoded audio data in the encoded audio data frame.

The method may further comprise; adding at least one further extension encoded audio data frame to the audio payload frame; and appending at least one further marker bit in front of the second marker bit, wherein the at least one further marker bit is set to the second value.

The encoded audio data frame may be an encoded mono channel data frame of a stereo signal, and wherein the extension encoded audio data frame may comprise encoded interchannel signal level values between the between the left and right channels of the stereo audio signal.

Alternatively the encoded audio data frame may be an encoded mono channel data frame of a frame of a multichannel audio signal, and wherein the extension encoded audio data frame may comprise encoded interchannel signal level values between the channels of the multichannel audio signal.

The at least one further extension encoded audio data frame may comprise further encoded interchannel signal level values between further channels of the multichannel audio signal.

The first value may be a bit value signifying core coding, and the second value may be a bit value signifying extension coding;

According to a second aspect there is provided a method for forming an audio payload frame, wherein the audio payload frame comprises: an encoded audio data frame with a first marker bit at the front of the encoded audio data frame, wherein the first marker is set to a first value, and wherein the first value denotes a type of encoded audio data in the encoded audio data frame; an extension encoded audio data frame; and a second marker bit in front of the first marker bit, wherein the second marker bit is set to a second value; and wherein the second value denotes a type of encoded audio data other than the type of encoded audio data in the encoded audio data frame.

The audio payload frame may further comprise: at least one further extension encoded audio data frame; and at least one further marker bit in front of the second marker bit, wherein the at least one further marker bit is set to the second value.

The encoded audio data frame may be an encoded mono channel data frame of a stereo signal, and wherein the extension encoded audio data frame may comprise encoded interchannel signal level values between the between the left and right channels of the stereo audio signal.

The encoded audio data frame may be an encoded mono channel data frame of a frame of a multichannel audio signal, and wherein the extension encoded audio data frame may comprise encoded interchannel signal level values between the channels of the multichannel audio signal.

The at least one further extension encoded audio data frame may comprise further encoded interchannel signal level values between further channels of the multichannel audio signal.

The first value may be a bit value signifying core coding, and the second value may be a bit value signifying extension coding.

According to a third aspect there is provided a data structure comprising: an encoded audio data frame with a first marker bit at the front of the encoded audio data frame, wherein the first marker is set to a first value, and wherein the first value denotes a type of encoded audio data in the encoded audio data frame; an extension encoded audio data frame; a second marker bit in front of the first marker bit, wherein the second marker bit is set to a second value; and wherein the second value denotes a type of encoded audio data other than the type of encoded audio data in the encoded audio data frame.

The data structure may further comprise: at least one further extension encoded audio data frame; and at least one further marker bit in front of the second marker bit, wherein the at least one further marker bit is set to the second value.

The encoded audio data frame may be an encoded mono channel data frame of a stereo signal, and wherein the extension encoded audio data frame may comprise encoded interchannel signal level values between the between the left and right channels of the stereo audio signal.

The encoded audio data frame may be an encoded mono channel data frame of a frame of a multichannel audio signal, and wherein the extension encoded audio data frame may comprise encoded interchannel signal level values between the channels of the multichannel audio signal.

The at least one further extension encoded audio data frame may comprise further encoded interchannel signal level values between further channels of the multichannel audio signal.

The first value may be a bit value signifying core coding, and the second value may be a bit value signifying extension coding.

According to a fourth aspect there is provided an apparatus configured to: form an audio payload frame from an encoded audio data frame; append a first marker bit at the front of the encoded audio data frame, wherein the first marker is set to a first value, and wherein the first value denotes a type of encoded audio data in the encoded audio data frame; add an extension encoded audio data frame to the audio payload frame; and append a second marker bit in front of the first marker bit, wherein the second marker bit is set to a second value; and wherein the second value denotes a type of encoded audio data other than the type of encoded audio data in the encoded audio data frame.

The apparatus may be further configured to; add at least one further extension encoded audio data frame to the audio payload frame; and append at least one further marker bit in front of the second marker bit, wherein the at least one further marker bit is set to the second value.

The encoded audio data frame may be an encoded mono channel data frame of a stereo signal, and wherein the extension encoded audio data frame may comprise encoded interchannel signal level values between the between the left and right channels of the stereo audio signal.

The encoded audio data frame may be an encoded mono channel data frame of a frame of a multichannel audio signal, and wherein the extension encoded audio data frame may comprise encoded interchannel signal level values between the channels of the multichannel audio signal.

The at least one further extension encoded audio data frame may comprise further encoded interchannel signal level values between further channels of the multichannel audio signal.

The first value may be a bit value signifying core coding, and the second value may be a bit value signifying extension coding;

There is provided according to a fifth aspect an apparatus configured to form an audio payload frame, wherein the audio payload frame comprises: an encoded audio data frame with a first marker bit at the front of the encoded audio data frame, wherein the first marker is set to a first value, and wherein the first value denotes a type of encoded audio data in the encoded audio data frame; an extension encoded audio data frame; and a second marker bit in front of the first marker bit, wherein the second marker bit is set to a second value; and wherein the second value denotes a type of encoded audio data other than the type of encoded audio data in the encoded audio data frame.

The audio payload frame may further comprise: at least one further extension encoded audio data frame; and at least one further marker bit in front of the second marker bit, wherein the at least one further marker bit is set to the second value.

The encoded audio data frame may be an encoded mono channel data frame of a stereo signal, and wherein the extension encoded audio data frame may comprise encoded interchannel signal level values between the between the left and right channels of the stereo audio signal.

The encoded audio data frame may be an encoded mono channel data frame of a frame of a multichannel audio signal, and wherein the extension encoded audio data frame may comprise encoded interchannel signal level values between the channels of the multichannel audio signal.

The at least one further extension encoded audio data frame may comprise further encoded interchannel signal level values between further channels of the multichannel audio signal.

The first value may be a bit value signifying core coding, and the second value may be a bit value signifying extension coding.

BRIEF DESCRIPTION OF DRAWINGS

For better understanding of the present application and as to how the same may be carried into effect, reference will now be made by way of example to the accompanying drawings in which.

DESCRIPTION OF SOME EMBODIMENTS

The following describes in more detail possible payload format for mono, stereo and multichannel speech and audio codecs, including multimode audio codecs.

Multimode audio codecs can seamlessly switch between one operating mode and another by informing the corresponding multimode audio decoder the mode of coding. The decoder can be informed of the mode of coding by the means of in-band signalling bits in the audio payload.

The format of the audio payload determines how the corresponding multimode audio decoder parses the coded audio information for subsequent decoding by the multimode audio decoder.

There may be a need for the format of the audio payload to have the flexibility to accommodate additional as yet unspecified audio coding modes in the existing framework. Typically this can be achieved by allowing for extra in-band signalling bits at the time the audio payload format is specified. However, this can result in wasted transmission bandwidth especially if the extra signalling bits are not used. Furthermore the framework lacks the ability to adapt the number of in-band signalling bits in accordance with the number of coding modes supported.

The concept as described herein may proceed from the aspect that a payload format for multimode audio coding can have an in-band signalling regime which can be flexible enough to incorporate the signalling of additional coding modes, whilst not pre-allocating extra in-band signalling bits to accommodate any future additional coding modes. Furthermore the in-band signalling regime within the audio payload format can be arranged such that a legacy decoder which can support a core set of the available coding modes as signalled by the in-band signalling regime can still decode the audio signal according to the core set of coding modes.

For example a legacy decoder may only have the capability of decoding a mono mode audio signal. In this instance the in-band signalling of the payload format may be configured to allow the decoder to ignore all other modes of decoding and just decode the embedded mono audio signal.

Figure 1:
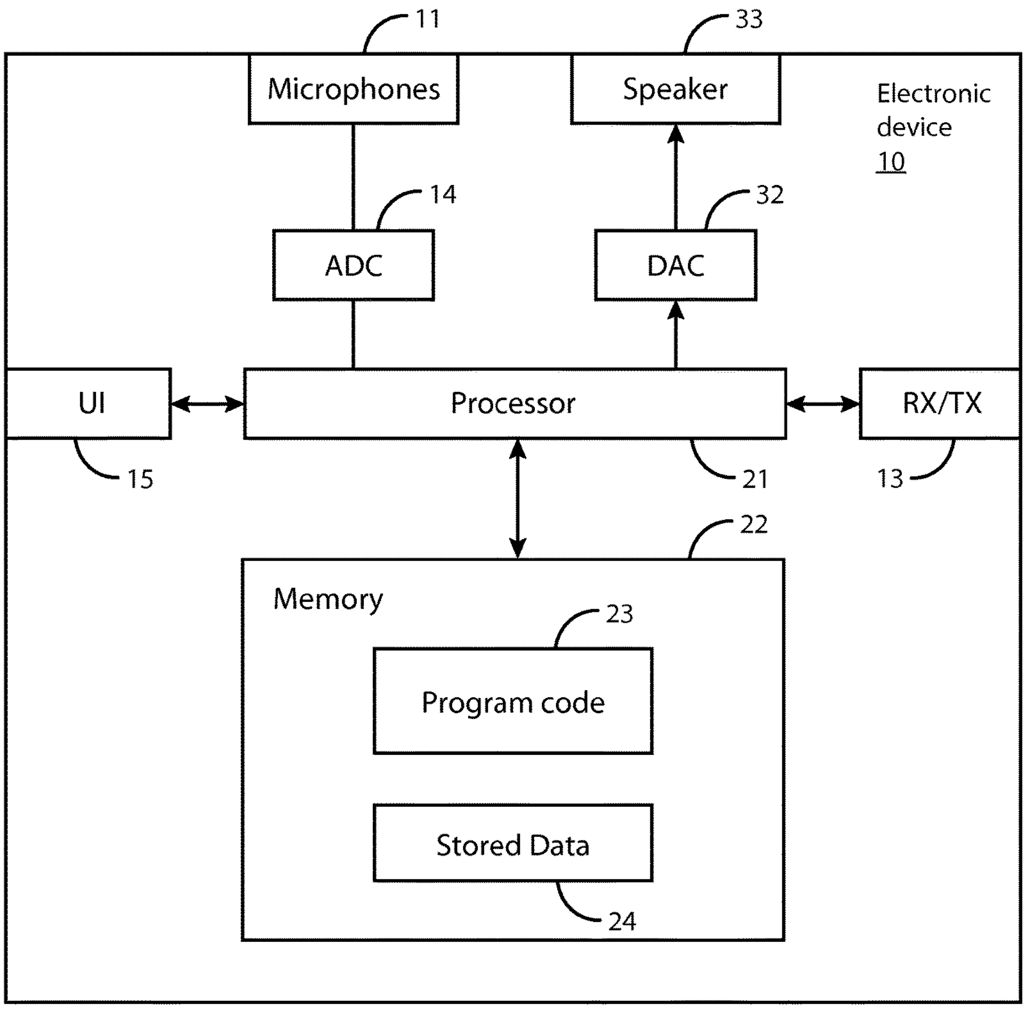
FIG. 1 shows schematically an electronic device employing some embodiments.

In this regard reference is first made to FIG. 1 which shows a schematic block diagram of an exemplary electronic device or apparatus 10, which may incorporate a codec according to an embodiment of the application.

The apparatus 10 may for example be a mobile terminal or user equipment of a wireless communication system. In other embodiments the apparatus 10 may be an audio-video device such as video camera, a Television (TV) receiver, audio recorder or audio player such as a mp3 recorder/player, a media recorder (also known as a mp4 recorder/player), or any computer suitable for the processing of audio signals.

The electronic device or apparatus 10 in some embodiments comprises a microphone 11, which is linked via an analogue-to-digital converter (ADC) 14 to a processor 21. The processor 21 is further linked via a digital-to-analogue (DAC) converter 32 to loudspeakers 33. The processor 21 is further linked to a transceiver (RX/TX) 13, to a user interface (UI) 15 and to a memory 22.

The processor 21 can in some embodiments be configured to execute various program codes. The implemented program codes in some embodiments comprise a multichannel or stereo encoding or decoding code as described herein. The implemented program codes 23 can in some embodiments be stored for example in the memory 22 for retrieval by the processor 21 whenever needed. The memory 22 could further provide a section 24 for storing data, for example data that has been encoded in accordance with the application.

The encoding and decoding code in embodiments can be implemented in hardware and/or firmware.

The user interface 15 enables a user to input commands to the electronic device 10, for example via a keypad, and/or to obtain information from the electronic device 10, for example via a display. In some embodiments a touch screen may provide both input and output functions for the user interface. The apparatus 10 in some embodiments comprises a transceiver 13 suitable for enabling communication with other apparatus, for example via a wireless communication network.

It is to be understood again that the structure of the apparatus 10 could be supplemented and varied in many ways.

A user of the apparatus 10 for example can use the microphone 11 for inputting speech or other audio signals that are to be transmitted to some other apparatus or that are to be stored in the data section 24 of the memory 22. A corresponding application in some embodiments can be activated to this end by the user via the user interface 15. This application in these embodiments can be performed by the processor 21, causes the processor 21 to execute the encoding code stored in the memory 22.

The analogue-to-digital converter (ADC) 14 in some embodiments converts the input analogue audio signal into a digital audio signal and provides the digital audio signal to the processor 21. In some embodiments the microphone 11 can comprise an integrated microphone and ADC function and provide digital audio signals directly to the processor for processing.

The processor 21 in such embodiments then processes the digital audio signal in the same way as described with reference to the system shown in FIG. 2 and the encoder shown in FIG. 3.

The resulting bit stream can in some embodiments be provided to the transceiver 13 for transmission to another apparatus. Alternatively, the coded audio data in some embodiments can be stored in the data section 24 of the memory 22, for instance for a later transmission or for a later presentation by the same apparatus 10.

The apparatus 10 in some embodiments can also receive a bit stream with correspondingly encoded data from another apparatus via the transceiver 13. In this example, the processor 21 may execute the decoding program code stored in the memory 22. The processor 21 in such embodiments decodes the received data, and provides the decoded data to a digital-to-analogue converter 32. The digital-to-analogue converter 32 converts the digital decoded data into analogue audio data and can in some embodiments output the analogue audio via the loudspeakers 33. Execution of the decoding program code in some embodiments can be triggered as well by an application called by the user via the user interface 15.

The received encoded data in some embodiment can also be stored instead of an immediate presentation via the loudspeakers 33 in the data section 24 of the memory 22, for instance for later decoding and presentation or decoding and forwarding to still another apparatus.

Figure 2:
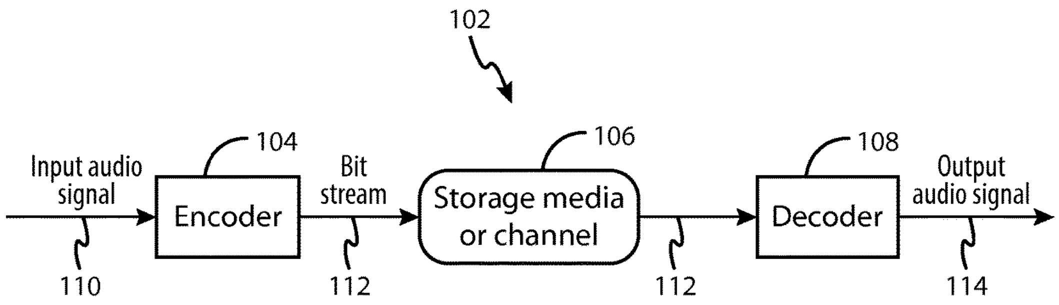
FIG. 2 shows schematically an audio codec system according to some embodiments.
Figure 3:
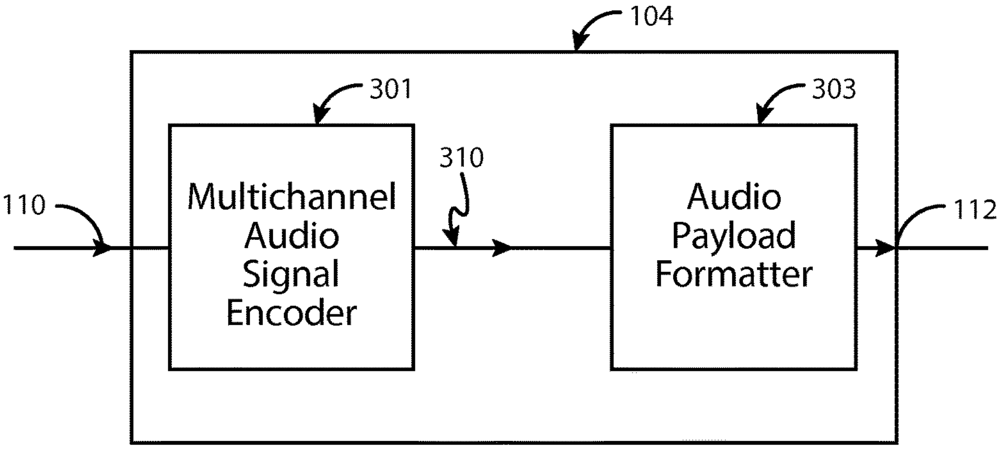
FIG. 3 shows schematically an encoder as shown in FIG. 2 according to some embodiments.
Figure 5:
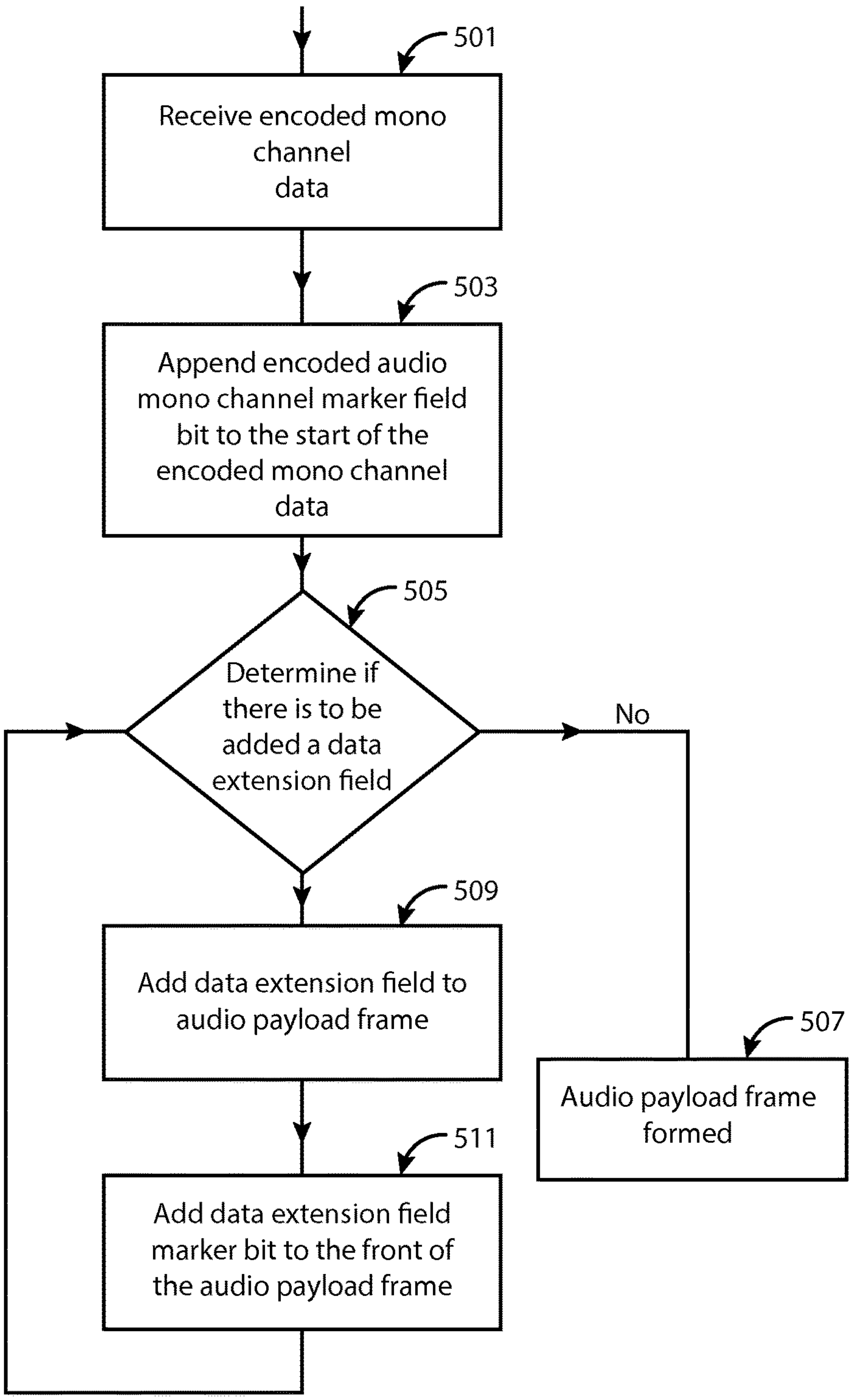
FIG. 5 shows a flow diagram illustrating the operation of the audio payload formatter shown in FIG. 3 according to some embodiments.

It would be appreciated that the schematic structures described in FIGS. 1 to 3, and the method steps shown in FIG. 5 represent only a part of the operation of an audio codec and specifically part of a multichannel encoder apparatus or method as exemplarily shown implemented in the apparatus shown in FIG. 1.

The general operation of audio codecs as employed by embodiments is shown in FIG. 2. General audio coding/decoding systems comprise both an encoder and a decoder, as illustrated schematically in FIG. 2. However, it would be understood that some embodiments can implement one of either the encoder or decoder, or both the encoder and decoder. Illustrated by FIG. 2 is a system 102 with an encoder 104 and in particular a multichannel audio signal encoder, a storage or media channel 106 and a decoder 108. It would be understood that as described above some embodiments can comprise or implement one of the encoder 104 or decoder 108 or both the encoder 104 and decoder 108.

The encoder 104 compresses an input audio signal 110 producing a bit stream 112, which in some embodiments can be stored or transmitted through a media channel 106. The encoder 104 furthermore can comprise a multichannel encoder 151 as part of the overall encoding operation. It is to be understood that the multichannel encoder may be part of the overall encoder 104 or a separate encoding module.

The bit stream 112 can be received within the decoder 108. The decoder 108 decompresses the bit stream 112 and produces an output audio signal 114. The decoder 108 can comprise a multichannel decoder as part of the overall decoding operation. It is to be understood that the multi-channel decoder may be part of the overall decoder 108 or a separate decoding module. The bit rate of the bit stream 112 and the quality of the output audio signal 114 in relation to the input signal 110 are the main features which define the performance of the coding system 102.

FIG. 3 shows schematically the encoder 104 according to some embodiments.

The concept for the embodiments as described herein is to encode the input multi-channel audio signal and then form the resulting bitstream of encoded audio parameters into an audio payload for transmission over the media channel 106. To that respect FIG. 3 shows an example encoder 104 according to some embodiments. Furthermore with respect to FIG. 5 the operation of at least part of the encoder 104 is shown in further detail.

The encoder 104 in some embodiments comprises a multichannel audio signal encoder 301. The multichannel audio signal encoder 301 can be configured to receive an audio signal 110 and generate an encoded audio signal 310. The audio signal encoder may be configured to receive either mono or multichannel audio signals and encode the signal accordingly. For example, the audio signal encoder may be arranged to receive a multi-channel audio signal with a left and a right channel, such as a stereo or binaural signal.

The input to the multichannel audio signal encoder 301 may comprises a frame sectioner/transformer which can be configured to section or segment the audio signal sections or frames suitable for frequency domain transformation. The frame sectioner/transformer can further be configured to window these frames or sections of audio signal data from each channel of the multichannel audio signal with any suitable windowing function. For example a frame sectioner/transformer can be configured to generate frames of 20 ms which may overlap preceding and succeeding frames by 10 ms each.

The frame sectioner/transformer can be configured to perform any suitable time to frequency domain transformation on the audio signals from each of the input channels. For example the time to frequency domain transformation can be a Discrete Fourier Transform (DFT), Fast Fourier Transform (FFT) and Modified Discrete Cosine Transform (MDCT). In the following examples a FFT is used. Furthermore the output of the time to frequency domain transformer can be further processed to generate separate frequency band domain representations (sub-band representations) of each input channel audio signal data. These bands can be arranged in any suitable manner. For example these bands can be linearly spaced, or be perceptual or psychoacoustically allocated.

The multichannel audio signal encoder 301 can comprise a relative audio energy signal level determiner which may be arranged to determine relative audio signal levels or interaural level (energy) difference (ILD) between pairs of channels for each sub band from the frequency band domain representations. The relative audio signal level for a sub band may be determined by finding an audio signal level in a frequency band of a first audio channel signal relative to an audio signal level in a corresponding frequency band of a second audio channel signal.

Any suitable interaural level (energy) difference (ILD) estimation can be performed. For example for each frame there can be two windows for which the delay and levels are estimated. Thus for example where each frame is 10 ms there may be two windows which may overlap and are delayed from each other by 5 ms. In other words for each frame there can be determined two separate level difference values which can be passed to the encoder for encoding. The differences for each window can be estimated for each of the relevant sub bands. The division of sub-bands can be determined according to any suitable method.

For example the sub-band division which in turn determines the number of interaural level (energy) difference (ILD) estimation can be performed according to a selected bandwidth determination. For example the generation of audio signals can be based on whether the output signal is considered to be wideband (WB), superwideband (SWB), or fullband (FB) (where the bandwidth requirement increases in order from wideband to fullband). For the possible bandwidth selections there can in some embodiments be a particular division in subbands.

The multichannel audio signal encoder 301 can comprise a channel analyser/mono encoder which can be configured to analyse the frequency domain representations of the input multi-channel audio signal and determine parameters associated with each sub-band with respect to bi-channel or multi-channel audio signal differences.

The multichannel audio signal encoder 301 can comprises a multi-channel parameter encoding unit for coding and quantizing the multi-channel audio signal differences. These encoded and quantized multi-channel audio signal differences can be referred to as multichannel extensions, or in the case of a stereo input signal the bi-channel audio signal differences can be referred to as stereo extensions.

Parameters associated with each sub band of the multi-channel audio signal can be down mixed in order to generate a mono channel which can be encoded according to any suitable encoding scheme.

The generated mono channel audio signal (or reduced number of channels encoded signal) can be encoded using any suitable encoding format. For example the mono channel audio signal can be encoded using an Enhanced Voice service (EVS) mono channel encoded form. The encoded mono channel audio signal can also be referred to as the cored codec encoded signal.

The output from the multichannel audio signal encoder 301 may then be connected by a connection to the input of a payload formatter 303 along which the encoded audio signal 310 may be conveyed. The encoded audio signal 310 may comprise the encoded mono channel signal and the encoded multi-channel audio signal differences.

The audio payload formatter 303 may be arranged to combine the encoded mono channel signal and the encoded multi-channel audio signal differences into a suitable payload format which may at least form part of an audio bitstream 112 for transmission over a suitable communication channel 106.

Figure 4:
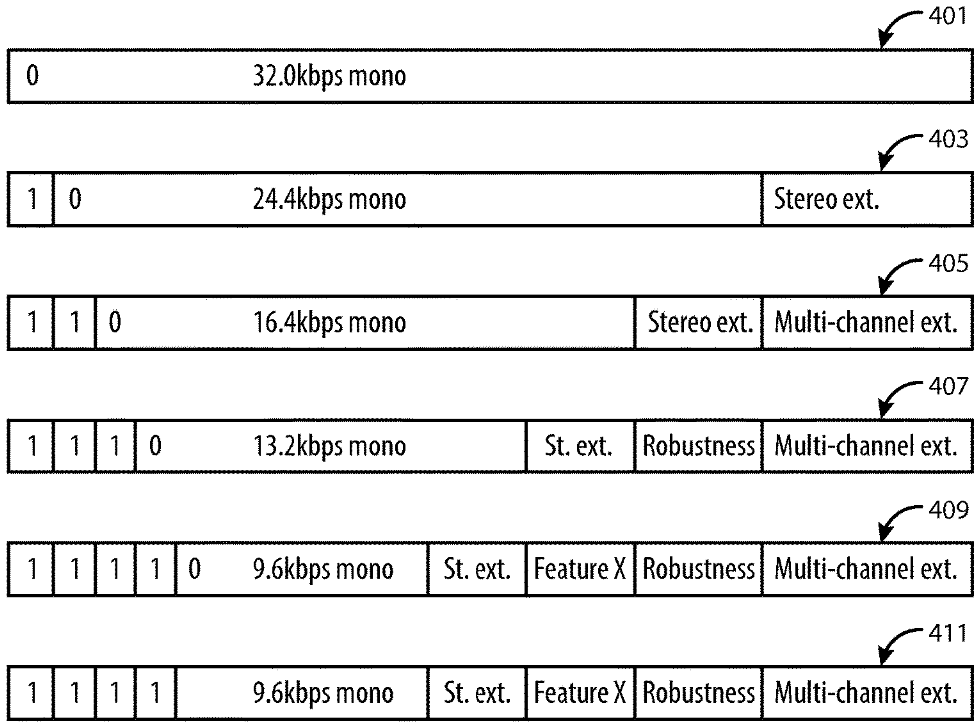
FIG. 4 shows schematically some examples of an audio payload frame from the audio payload formatter shown in FIG. 3 according to some embodiments.

With respect to FIG. 4 there is shown some examples of audio payload frame which may be formed by the audio payload formatter 303.

The audio payload formatter 303 may be arranged to form an audio payload frame by appending a single bit field to the beginning of a frame of an encoded audio mono channel signal. This single bit filed can be used to signify the start of the data associated with the encoded audio mono channel signal. The single bit field may be referred to as the encoded audio mono channel marker field.

It is to be appreciated that since the encoded audio mono channel signal may also be referred to as a core codec channel signal, and the encoded audio mono channel marker field bit may be set to a value which signifies core codec. An example of a value of the encoded audio mono channel marker field bit which signifies core codec is the bit value "0".

With reference to FIG. 4 there is shown an example of an audio payload frame or data structure 401 as produced by the audio payload formatter 303 containing solely an encoded audio mono channel data frame at a data rate of 32 kbps. The encoded mono channel marker field bit has been set to core codec or "0" to denote the start of a frame of encoded audio mono channel data.

In other words the payload formatter 303 may produce an audio payload frame or data structure comprising an encoded audio mono channel data frame in which the first bit is the encoded audio mono channel marker field bit.

The audio payload formatter 303 may also append extension data field marker bits to the beginning of the payload data frame in order to signify that the payload data frame also contains data extension fields. The data extension fields can be in addition to the encoded audio mono channel data frame.

The data extension field can be the encoded multi-channel signal differences associated with a stereo channel, or in other words a stereo extension field.

Additionally the data extension field can be the encoded multi-channel signal differences associated with a channel configuration which is other than a stereo channel configuration, or more generally known as a multichannel extension field.

It is to be appreciated that the term multichannel extension field can also be used to encompass encoded multichannel signal differences which may be associated with channels which are in addition to a stereo channel pair.

The extension data field marker bits can be appended before the encoded audio mono channel field marker bit, and the number of extension data field marker bits denotes the number of data extension fields in the payload data frame.

In order that the data extension field marker bits can be distinguished from the encoded audio mono channel field marker bit they can be set to a value different to that of the encoded audio mono channel field marker bit. In other words the data extension field marker bits can be set to extension coding.

For instance, in the above example a bit value of "0" is used to denote the encoded audio mono channel field marker bit being set to core coding and therefore data extension field marker bits can be set to extension coding and arranged to carry a value of "1".

With reference to FIG. 4 there is an example of an audio payload frame 403 containing an encoded audio mono channel data frame at the coding rate of 24 kbps and a data extension field of the type stereo extension. From 403 it can be seen that the data extension field marker bit "1" is before the encoded audio mono channel field marker bit "0". Therefore upon parsing the first bit position of the audio payload data frame a decoder will be able to infer that there is contained one data extension field, and upon parsing the next bit position of the audio payload frame the decoder will be able to further deduce the start of the encoded audio mono channel data frame.

In other words the payload formatter 303 may produce an audio payload frame or data structure comprising an encoded audio mono channel data frame in which at the beginning of the encoded audio mono channel data frame is the encoded audio mono channel marker field bit. The audio payload frame may also contain a data extension field of the type stereo extension. The data extension field marker bit can be set to the value extension coding and is in a position within the audio payload before the bit position of the audio channel field marker bit.

With reference to FIG. 4 there is shown a further example of an audio payload data frame 405 containing an encoded audio mono channel data frame at the coding rate of 16.4 kbps, a stereo extension field and a multichannel extension field. It can be seen that the audio payload frame has been front loaded with two data extension field marker bits in order to signify that there are two data extension fields present in the payload data frame, and as before the first "0" denotes the start of the encoded mono audio channel data frame.

In other words the payload formatter 303 may produce an audio payload frame or data structure comprising an encoded audio mono channel data frame in which at the beginning of the encoded audio mono channel data frame is the encoded audio mono channel marker field bit. The audio payload frame may also contain a number of data extension fields. The corresponding number of data extension field marker bits can be set to the value extension coding and are in a position within the audio payload frame before the bit position of the audio channel field marker bit. That is the first number of bit positions of the audio payload frame each comprises a data extension marker bits, each data extension marker bit is set to extension coding value, and the number of data extension marker bits at the beginning of the audio payload frame indicates the number of data extension fields in the audio payload frame.

With reference to FIG. 5 there is shown schematically a flow diagram depicting a method of operation of the audio payload formatter 303.

The audio payload formatter 303 may be arranged to form the audio payload data frame in a recursive manner by initially receiving the encoded audio parameters associated with the encoded audio mono channel frame from the audio signal encoder 301.

The step of receiving the encoded audio mono channel data frame is shown as processing step 501 in FIG. 5.

The audio payload formatter 303 may then at least form part of the audio payload frame by appending an encoded audio mono channel field marker bit to the front of the encoded audio mono channel data frame. The audio channel field marker bit is set to core coding.

The step of appending the encoded mono channel frame marker bit to the front of the encoded audio mono channel data frame is shown as processing step 503 in FIG. 5.

The audio payload formatter 303 may then determine if there is to be added encoded data associated with a data extension field. This may be depicted in FIG. 5 as the decision step 505.

If the audio payload formatter 303 determines at the processing step 505 that there is no further data extension fields to be added to the audio payload frame, the audio payload formatter 303 will cease to add data extension fields to the audio payload frame thereby determining the audio payload frame is formed. This termination step may be depicted as in FIG. 5 as the step 507.

However, if the audio payload formatter 303 determines at processing step 505 that a data extension field is to be added to the audio payload frame, the audio payload formatter 303 may add the data extension field marker bit to the front of the audio payload frame and accordingly include the further data extension field into the structure of said audio payload data frame. The data extension field marker bit can be set to extension coding by the audio payload formatter 303. These steps may be depicted as processing steps 509 and 511 respectively in FIG. 5.

Upon incorporation of the multichannel extension field into the audio payload frame, the audio payload formatter 303 may be further arranged to check if there are any further data extension fields to incorporate into the audio payload frame. The checking for any further data extension fields by the audio payload formatter 303 may be depicted by the return loop path 513 in FIG. 5.

With reference to FIG. 4 there is yet a further example of an audio payload frame 407 containing an encoded audio mono channel data frame at a coding rate of 13.2 kbps, a stereo extension field, a multichannel extension field, and an additional robustness field. It can be seen that the repercussive nature of the payload data frame forming process as depicted in FIG. 5 has resulted in the audio payload frame 407 being front loaded with three data extension field marker bits in order to signify that there are three data extension fields present in the payload data frame. As above the series of data extension marker bits are followed by the encoded audio mono channel field marker bit "0" to denote the start of the encoded audio mono channel data frame.

With further reference to FIG. 4 there is still yet a further example of an audio payload frame 409 containing an encoded audio mono channel data frame at a coding rate of 9.6 kbps. This coding rate may correspond to the lowest stereo encoding rate supported by the encoder, in which the combination of the audio mono channel data frame coding rate, together with the encoded audio mono channel field marker bit and the stereo extension field may yield the overall stereo coding rate of 13.2 kbps. Additionally FIG. 4 depicts the result of front loading the audio payload frame 409 with four data extension field marker bits in order to signify the presence of four data extension fields.

Also with reference to FIG. 4 there is shown the audio payload frame 411 a variant of the above example audio payload frame 409 in which the lowest stereo coding rate of 13.2 kbps comprises an encoded audio mono channel data frame at a coding rate of 9.6 kbps, together with a stereo extension field. However, this particular example does not have the encoded audio mono channel field marker bit. In this particular example of an audio payload frame, it is intended that the any decoder would be aware that a stereo coding rate would always use the lowest encoded audio mono channel data frame coding rate of 9.6 kbps, and as such there is no need to provide an encoded audio mono channel field marker bit.

Table 1 below shows an example set of possible operating bit rates for an EVS codec using an audio payload formatter as described herein. It is to be appreciated that the EVS codec is a variable bit rate codec which can be configured to operate at any one of a number of different bit rates on a frame by frame basis. Additionally the EVS codec can be configured to operate in a number of different modes of operation. Table 1 depicts a number of different possible operating bit rates of the EVS for two modes of operation that of mono mode and a stereo mode.

TABLE 1

| Total codec rate | Mono rate | Available stereo rate | Stereo signaling overhead |
|---|---|---|---|
| 9.6 | 9.6 | 0 | — |
| 13.2 | 9.6 | 3.55 | 0.05 |
| 16.4 | 13.2 | 3.15 | 0.05 |
| 24.4 | 16.4 | 7.95 | 0.05 |
| 32 | 24.4 | 7.55 | 0.05 |
| 48 | 32 | 15.95 | 0.05 |
| 64 | 48 | 15.95 | 0.05 |
| 96 | 64 | 31.95 | 0.05 |
| 128 | 96 | 31.95 | 0.05 |

It is to be further appreciated that as described above the EVS codec can be arranged to encode a stereo or bi-channel audio signal as a down mixed single mono audio channel together with a stereo or bi-channel extension. Accordingly, in Table 1 the first column depicts a number of different possible total codec rates in kbps over which the coding rate of the EVS codec can be varied. The second column depicts the coding rate in kbps allocated for the encoded mono channel signal for each total codec rate, the third column depicts the coding rate in kbps allocated for the stereo extension for each total codec rate and the fourth column depicts the overhead in kbps required to signal the stereo extension according to a payload formatter such as described herein.

Although the above examples describe embodiments of the application operating within a codec within an apparatus 10, it would be appreciated that the invention as described below may be implemented as part of any audio (or speech) codec, including any variable rate/adaptive rate audio (or speech) codec. Thus, for example, embodiments of the application may be implemented in an audio codec which may implement audio coding over fixed or wired communication paths. Furthermore, it is to be understood that the coding modes and their associated bit rates of Table 1 are exemplary, and the codec may be configured to implement another set of coding modes. For example, it may be that stereo extensions are implemented starting at total bit rate of 16.4 kbps rather than 13.2 kbps as indicated in Table 1.

Thus user equipment may comprise an audio codec such as those described in embodiments of the application above.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio codecs as described above.

In general, the various embodiments of the application may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the application may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:

forming an audio payload frame from an encoded audio data frame;

appending a first marker bit at the front of the encoded audio data frame, wherein the first marker is set to a first value, and wherein the first value denotes a type of encoded audio data in the encoded audio data frame;

adding an extension encoded audio data frame to the audio payload frame; and appending a second marker bit in front of the first marker bit, wherein the second marker bit is set to a second value; and wherein the second value denotes a type of encoded audio data other than the type of encoded audio data in the encoded audio data frame.

2. The method as claimed in claim 1 further comprising:

adding at least one further extension encoded audio data frame to the audio payload frame; and appending at least one further marker bit in front of the second marker bit, wherein the at least one further marker bit is set to the second value.

3. The method as claimed in claim 1, wherein the encoded audio data frame is an encoded mono channel data frame of a stereo signal, and wherein the extension encoded audio data frame comprises encoded interchannel signal level values between left and right channels of a stereo audio signal.

4. The method as claimed in claim 1, wherein the encoded audio data frame is an encoded mono channel data frame of a frame of a multichannel audio signal, and wherein the extension encoded audio data frame comprises encoded interchannel signal level values between channels of a multichannel audio signal.

5. The method as claimed in claim 4, wherein the at least one further extension encoded audio data frame comprises further encoded interchannel signal level values between further channels of the multichannel audio signal.

6. The method as claimed in claim 1, wherein the first value is a bit value signifying core coding, and the second value is a bit value signifying extension coding.

7. An apparatus comprising at least one processor and at least one memory including computer program code, the at least one memory and the computer program code configured to, with the at least one processor, cause the apparatus to:

form an audio payload frame from an encoded audio data frame;

append a first marker bit at the front of the encoded audio data frame, wherein the first marker is set to a first value, and wherein the first value denotes a type of encoded audio data in the encoded audio data frame;

add an extension encoded audio data frame to the audio payload frame; and append a second marker bit in front of the first marker bit, wherein the second marker bit is set to a second value; and wherein the second value denotes a type of encoded audio data other than the type of encoded audio data in the encoded audio data frame.

8. The apparatus as claimed in claim 7, wherein the apparatus is further caused to:

add at least one further extension encoded audio data frame to the audio payload frame; and append at least one further marker bit in front of the second marker bit, wherein the at least one further marker bit is set to the second value.

9. The apparatus as claimed in claim 7, wherein the encoded audio data frame is an encoded mono channel data frame of a stereo signal, and wherein the extension encoded audio data frame comprises encoded interchannel signal level values between left and right channels of a stereo audio signal.

10. The apparatus as claimed in claim 7, wherein the encoded audio data frame is an encoded mono channel data frame of a frame of a multichannel audio signal, and wherein the extension encoded audio data frame comprises encoded interchannel signal level values between channels of a multichannel audio signal.

11. The apparatus as claimed in claim 10, wherein the at least one further extension encoded audio data frame comprises further encoded interchannel signal level values between further channels of the multichannel audio signal.

12. The apparatus as claimed in claim 7, wherein the first value is a bit value signifying core coding, and the second value is a bit value signifying extension coding.

13. A computer program product embodied on a non-transitory computer readable medium, comprising computer program code configured to, when executed on at least one processor, cause an apparatus or a system to:

form an audio payload frame from an encoded audio data frame;

append a first marker bit at the front of the encoded audio data frame, wherein the first marker is set to a first value, and wherein the first value denotes a type of encoded audio data in the encoded audio data frame;

add an extension encoded audio data frame to the audio payload frame; and append a second marker bit in front of the first marker bit, wherein the second marker bit is set to a second value; and wherein the second value denotes a type of encoded audio data other than the type of encoded audio data in the encoded audio data frame.

14. The computer program product as claimed in claim 13, wherein the computer program code further causes the apparatus to:

add at least one further extension encoded audio data frame to the audio payload frame; and append at least one further marker bit in front of the second marker bit, wherein the at least one further marker bit is set to the second value.

15. The computer program product as claimed in claim 13, wherein the encoded audio data frame is an encoded mono channel data frame of a stereo signal, and wherein the extension encoded audio data frame comprises encoded interchannel signal level values between left and right channels of a stereo audio signal.

16. The computer program product as claimed in claim 13, wherein the encoded audio data frame is an encoded mono channel data frame of a frame of a multichannel audio signal, and wherein the extension encoded audio data frame comprises encoded interchannel signal level values between channels of a multichannel audio signal.

17. The computer program product as claimed in claim 16, wherein the at least one further extension encoded audio data frame comprises further encoded interchannel signal level values between further channels of the multichannel audio signal.

18. The computer program product as claimed in claim 13, wherein the first value is a bit value signifying core coding, and the second value is a bit value signifying extension coding.

* * * * *